United States Patent [19]

Sommer

[11] 3,713,517

[45] Jan. 30, 1973

[54] CLUTCH-BRAKE WITH LIQUID AND AIR COOLING

[75] Inventor: Gordon M. Sommer, Grosse Pointe Woods, Mich.

[73] Assignee: G. M. Sommer Co., Inc., Detroit, Mich.

[22] Filed: Aug. 2, 1971

[21] Appl. No.: 167,990

Related U.S. Application Data

[63] Continuation-in-part of Ser. No. 804,771, March 6, 1969, Pat. No. 3,614,999.

[52] U.S. Cl............192/18 A, 192/113 B, 188/264 E
[51] Int. Cl...............................................F16d 67/04
[58] Field of Search ...192/18 A, 12 C, 87.17, 113 A, 192/113 B

[56] References Cited

UNITED STATES PATENTS

| | | |
|---|---|---|
| 3,494,450 | 2/1970 | Mankowsky et al.................192/18 A |
| 2,441,543 | 5/1948 | Longfield..........................192/18 A |
| 3,020,990 | 2/1962 | Liv.....................................192/18 A |
| 2,193,068 | 3/1940 | Keck..................................192/18 A |
| 2,785,781 | 3/1957 | Johansen......................192/113 A X |
| 2,966,245 | 12/1960 | Judge................................192/18 A |
| 3,177,994 | 4/1965 | Jewson..............................192/18 A |

*Primary Examiner*—Benjamin W. Wyche
*Attorney*—J. King Harness et al.

[57] ABSTRACT

A clutch-brake unit comprising a relatively fixedly mounted support structure, a drive shaft rotatable relative to the support structure, a housing rotatable relative to the support structure and at least partially surrounding the shaft, a brake within the housing and adapted for non-rotatably connecting the shaft to the support structure, a clutch within the housing for drivingly connecting the housing with the shaft, and actuating means for selectively energizing the clutch while simultaneously releasing the brake and vice versa. The housing is at least partially filled with lubricating fluid wherefrom heat is adapted to be transferred by contact with the housing and a driving member connected therewith.

10 Claims, 5 Drawing Figures

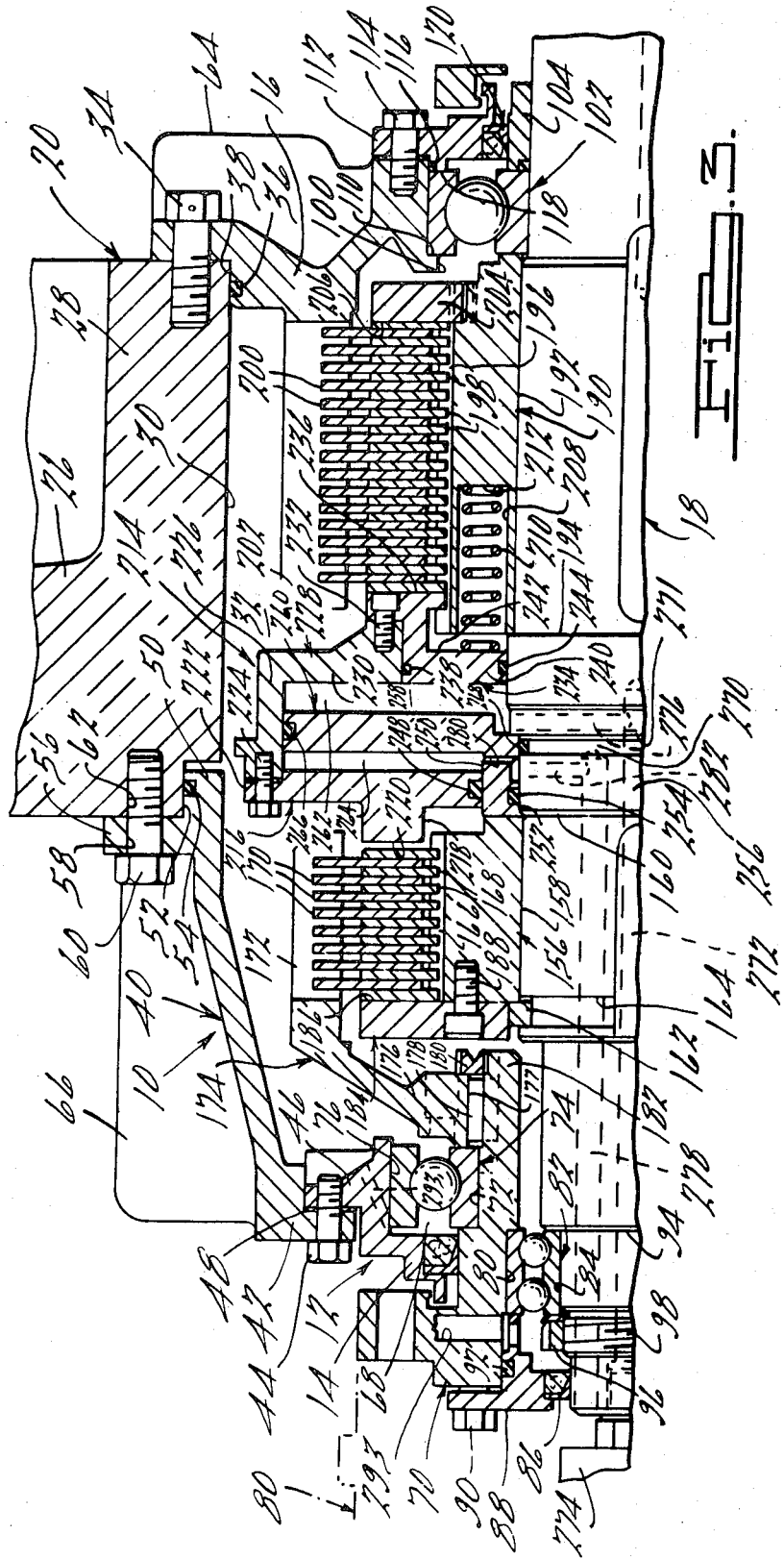

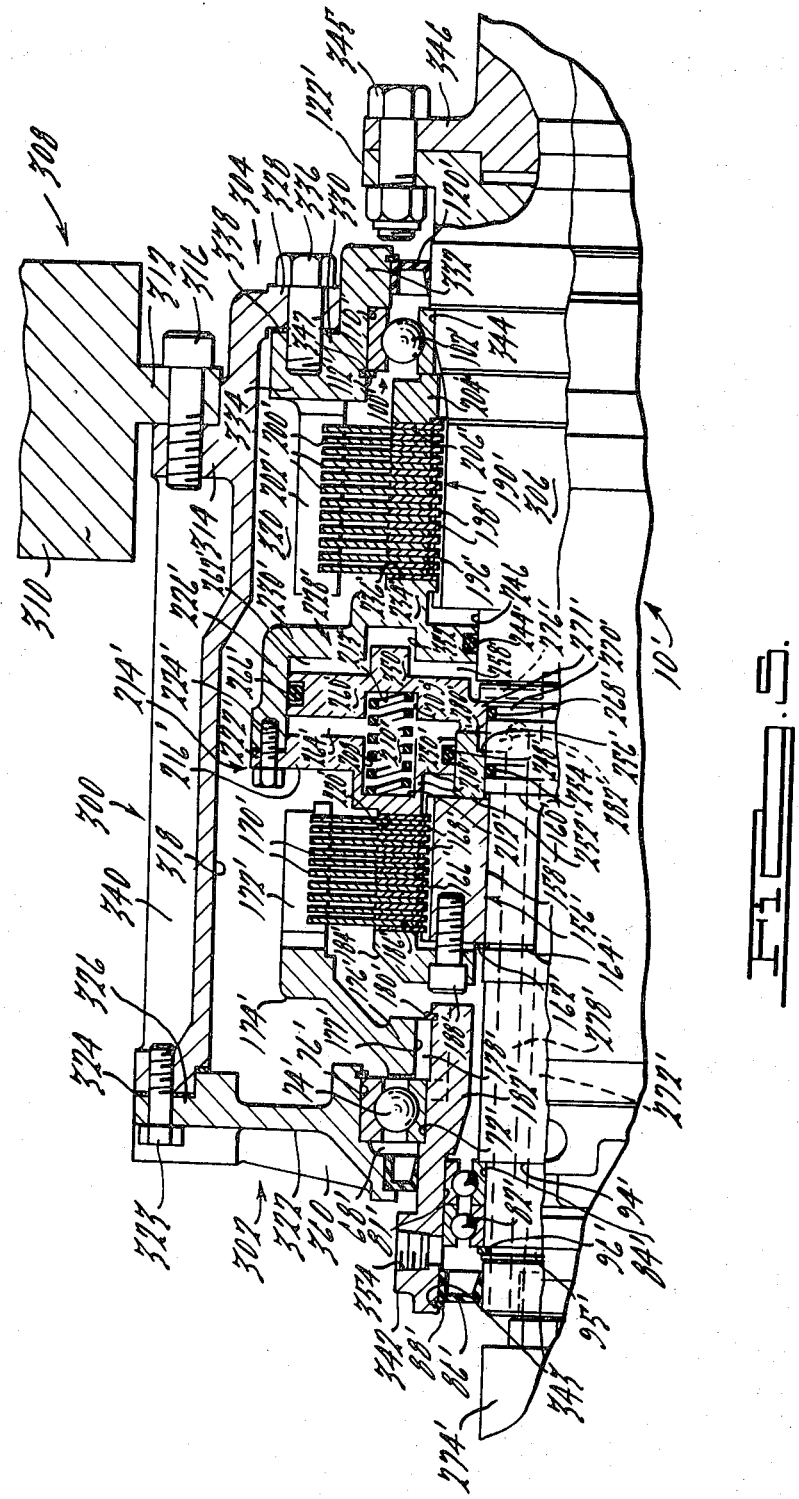

CLUTCH-BRAKE WITH LIQUID AND AIR COOLING

CROSS REFERENCE TO PRIOR APPLICATION

This application is a continuation-in-part of U.S. application, Ser. No. 804,771, filed Mar. 6, 1969, and now U.S. Pat. NO. 3,614,999, for Clutch and Brake with Cooling Means. The above indicated application is assigned to the assignee of the subject application.

SUMMARY OF THE INVENTION

This invention relates generally to clutch-brake units and, more particularly, to a new and improved oil cooled clutch-brake unit adapted particularly, although not necessarily, for use in operative association with punch presses and the like.

It is accordingly a general object of the present invention to provide a new and improved clutch-brake unit.

It is a more particular object of the present invention to provide a new and improved clutch-brake unit that is extremely small or compact in size.

It is another object of the present invention to provide a new and improved clutch-brake unit that utilizes a plurality of oil submerged friction disc torque transmitting elements which will exhibit a minimal amount of wear by virtue of the fact that the torque transmitting function is achieved by the shearing of oil interjacent the discs.

It is still another object of the present invention to provide a new and improved clutch-brake unit of the above character that can be operated at high speeds and at high cyclic rates as a result of a low drive inertia and an effective oil cooling medium.

It is a further object of the present invention to provide a clutch-brake unit wherein the clutch and brake functions are mechanically interlocked, whereby to prevent damage to the unit due to improper timing.

It is yet another object of the present invention to provide a clutch-brake unit of the above described type that features a balancing chamber for the pressurized air actuated piston thereof, whereby to minimize piston displacement during cyclic operation of the unit.

It is another object of the present invention to provide a new and improved clutch-brake unit that will find universality of application.

Further important objects of the present invention are to provide a new and improved clutch-brake unit which is simple in design, economical to produce and operate, extremely rugged and maintenance-free during operation, and wherein the input and output shafts thereof are readily adapted for mounting to any associated machine, gears, sheaves, couplings, etc.

It is yet a further object of the present invention to provide a new and improved clutch-brake unit that is adapted to be mounted directly within the hub of a rotating member, such as, for example, a rotatable flywheel or the like.

It is still a further object of the present invention to provide a new and improved clutch-brake unit that is adapted to "fail safe", i.e., in the braked condition, upon loss of pressure of the actuating medium.

Other objects and advantages of the present invention will become apparent from the following detailed description taken in conjunction with the accompanying drawings.

BRIEF DESCRIPTION OF THE DRAWINGS

FIG. 3 is an enlarged longitudinal cross-sectional view of the first preferred clutch-brake unit illustrated in FIG. 1;

FIG. 5 is a partial enlarged longitudinal cross-sectional view of a preferred second embodiment of a clutch-brake unit also embodying the principality of the present invention.

DETAILED DESCRIPTION OF THE PREFERRED EMBODIMENTS

Generally speaking, the clutch-brake unit of the present invention is adapted to find particularly useful application in connection with the flywheel or a similar rotatable member of a metal forming or stamping press or the like. Although the present invention will find varied use in many other types of applications, as will more particularly be described, due to the especially useful application of the present invention with a typical rotary flywheel, the present invention is shown and described, by way of example, in operative association therewith.

Figure 1:
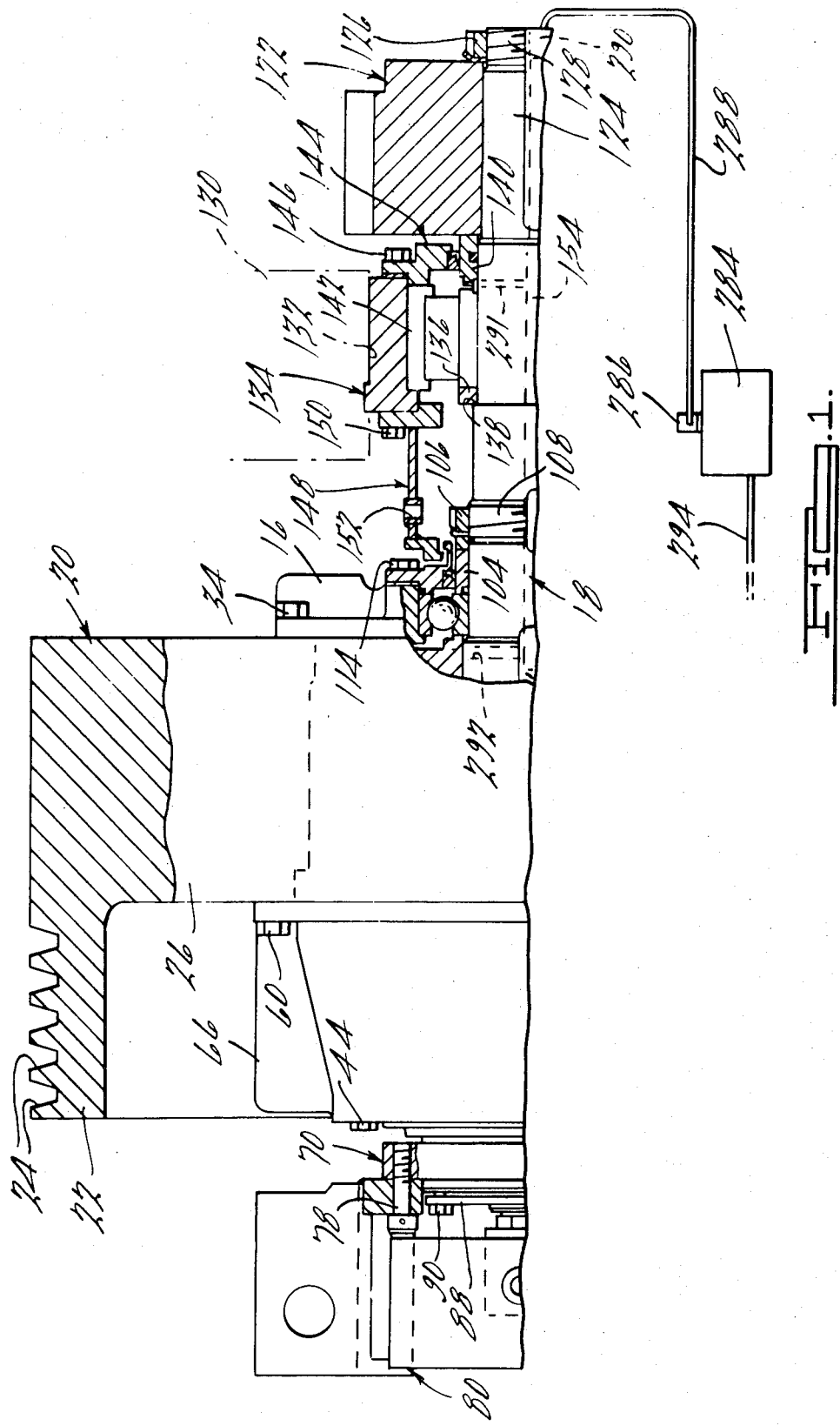
FIG. 1 is a longitudinal side elevational view, partially broken away, of a preferred first embodiment of a clutch-brake unit embodying the principality of the present invention.
Figure 2:
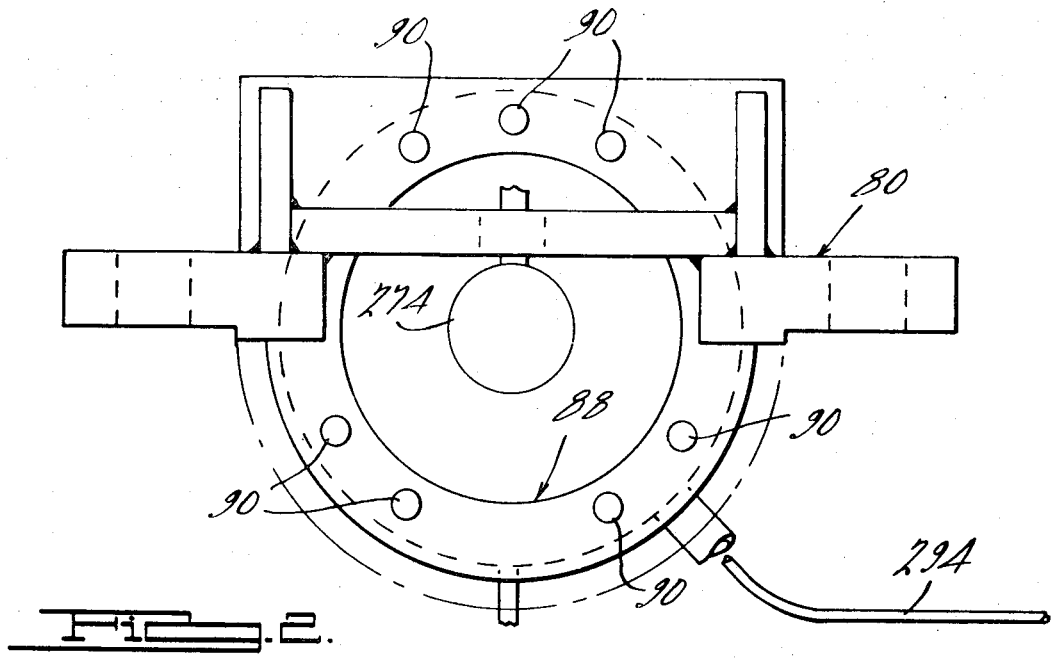
FIG. 2 is an end elevational view of the left end of the first preferred unit illustrated in FIG. 1.

Referring now in detail to the drawings and in particular to FIGS. 1 and 3, a first embodiment of a clutch-brake unit 10, in accordance with the present invention, is shown generally as comprising a rotatable housing 12 having a pair of end wall members 14 and 16 which are spaced axially or longitudinally along a rotatable drive shaft, generally designated by the numeral 18. The housing 12 forms an inner hub assembly for operatively connecting a rotatable flywheel, generally designated 20, to the shaft 18, with the flywheel 20 comprising an outer peripheral, relatively massive, section 22 having a plurality of axially spaced, radially inwardly extending V-belt receiving grooves 24 formed in the outer side thereof. The section 22 of the flywheel 20 is formed with an integral, radially inwardly extending web or spoke section 26 that terminates at its radially innermost portion in an axially extending annular sleeve or collar section 28 defining a central axially extending bore 30 spaced radially outwardly from the periphery of the shaft 18 and defining one marginal wall portion of an internal cavity 32 within which are located the clutch and brake elements of the present invention. One axial end of the cavity 32 is closed by the end wall 16 which is fixedly secured by suitable screws, bolts or the like 34 to the flywheel section 28, with suitable O-ring sealing means or the like 36 being provided between an annular, axially extending shoulder 38 formed on the wall member 16 and the axially outer end of the periphery of the bore 30, as best seen in FIG. 3. The end of the cavity 32 opposite that which is closed by the end wall member 16 is adapted to be closed by the end wall member 14 and a generally axially and radially outwardly extending enclosure member, generally designated by the numeral 40. The member 40 is formed with a radially inwardly extending flange section 42 at one axial end thereof, which section 42 is fixedly secured by means of a plurality of circumferentially spaced, axially extending suitable screws, bolts or the like 44 to a radially outwardly projecting shoulder 46 formed around the outer periphery of the member 14, suitable fluid-tight gasket means 48 being provided between the confronting sides of the sections 42 and 46. The opposite end of the member 40 is formed with an axially extending section 50 adapted to bear against an annular, axially extending recess 52 formed around the inner periphery of the flywheel section 28, with suitable O-ring sealing means or the like 54 being provided interjacent the confronting surfaces of the section 50 and recess 52 to provide a fluid-tight seal therebetween. The member 40 is formed with a radially outwardly extending flange section 56 directly adjacent the section 50 thereof, which section 56 is formed with a plurality of circumferentially spaced, axially extending openings 58 through which a plurality of axially extending screws, bolts or the like 60 extend and are threadably received within suitable threaded bores 62 in the flywheel 20 for rigidly securing the member 40 thereto. The members 16 and 40 are preferably provided with circumferentially space, axially extending ribs or fins, generally designated 64 and 66, for purposes of heat dissipation, as will later be described in detail.

The end wall member 14 defines a central opening 68 which is arranged coaxially of the drive shaft 18 and the periphery of which is spaced radially outwardly from the outer surface of the drive shaft 18. Disposed between the inner periphery of the opening 68 and the outer periphery of the drive shaft 18 is an annular, axially extending support member, generally designated by the numeral 70. The inner end of the member 70 extends axially inwardly from the end wall member 14 and defines an annular axially extending shoulder 72 upon which the inner race of an anti-friction bearing assembly 74 is mounted. The outer race of the assembly 74 abuts against an annular shoulder 76 defined around the inner periphery of the member 14, with the result that the members 14 and 40, and thus the entire flywheel 20, is rotatably supported relative to the support member 70. As best seen in FIGS. 1 and 3, the member 70 is adapted to be fixedly secured by means of suitable screws, bolts, or the like 78 to an associated non-rotatable structure, generally designated 80, which functions to support the entire adjacent end of the clutch-brake unit 10 embodying the present invention. The structure 80 may be of any suitable construction which is of a relatively rugged, heavy-duty design as is necessary and conventional in rotatably supporting the flywheel 20 which may typically be in the order of several thousand pounds in weight. Together with carrying the bearing assembly 74, the support member 70 also supports another anti-friction bearing assembly, generally designated 82, the inner race of which is engaged with an annular shoulder 84 formed around the adjacent end of the drive shaft 18, and the outer race of which is received within an annular recess 81 formed around the inner periphery of the support member 70. The bearing assembly 82, together with suitable fluid sealing means, such as an annular lip seal or the like 86, is positively retained in place in the end of the support member 70 by means of a suitable retaining plate 88 which is fixedly secured to the axially outer side of the member 70 by means of a plurality of suitable circumferentially spaced, axially extending screws, bolts or the like 90. Preferably, suitable O-ring sealing means or the like 92 is provided between the outer periphery of the retaining plate 88 and the inner diameter of the support member 70, as illustrated. The inner race of the bearing assembly 82 is also preferably secured upon the inner end of the drive shaft 18 by being axially compressed between a radially outwardly extending abutment wall 94 defined by the shaft 18 and a suitable retaining ring 96 that is threadably received upon externally threaded section 98 of the shaft 18.

The end wall member 16 defines a central opening 100 that is coaxially aligned with the opening 68 and through which one end of the drive shaft 18 extends. The shaft 18 is rotatably supported relative to the opening 100 by means of an anti-friction bearing assembly 102, the inner race of which is secured to the shaft 18 by means of a pair of retaining rings 104 and 106, the latter of which may be threadably received upon a suitable externally threaded section 108 of the shaft 18. The outer race of the bearing assembly 102 is adapted to be axially compressed between an annular shoulder 110 formed around the periphery of the opening 100 and an annular clamping ring 112 that is fixedly secured by a plurality of circumferentially spaced axially extending screws, bolts, or the like 114, to the axially outer side of the end wall member 16, with suitable O-ring sealing means or the like 116 being provided between the radially outer side of an axially extending shoulder 118 on the ring 112 and the periphery of the opening 100. Also, suitable lip sealing means or the like 120 is provided between the inner periphery of the clamping ring 112 and the outer periphery of the retaining ring 104.

The drive shaft 18 extends axially outwardly from the end wall 16 and is provided, at the axially outer end thereof, with a suitable pinion gear, generally designated 122, which may be secured upon a reduced diameter section 124 of the shaft 18 by means of a suitable retaining ring 126 received upon an externally threaded portion 128 of the shaft 18. The pinion gear 122 is preferably keyed in a conventional manner to the shaft 18 and is designed to transmit motive power from the flywheel 20 to an associated gear in a manner hereinafter to be described. The end of the shaft 18, between the end wall member 16 and pinion gear 122, is adapted to be rotatably supported upon a suitable support section 130 of the support structure 80 that is disposed upon the axially opposite side of the housing 12 from the support member 70, as best seen in FIG. 1. The support section 130 defines a central opening 132 that is coaxially aligned with the openings 100 and 68 and is adapted to receive and support a suitable heavy-duty anti-friction bearing assembly, generally designated 134. The assembly 134 comprises an inner race 136 that is axially compressed between a radial shoulder 138 on the shaft 18 and a suitable spacing ring 140 disposed axially inwardly from the pinion gear 122, the assembly 134 also comprises an outer race 142 which is adapted to be retained in place by a suitable annular retaining plate 144 fixedly mounted by means of suitable screws, bolts or the like 146 circumferentially spaced around the plate 144. Extending interjacent the clamping ring 112 and the anti-friction bearing assembly 134 is an annular shroud or enclosure member 148, one end of which is secured by suitable screws, bolts, or the like 150 to the bearing assembly 134, while the opposite end thereof terminates adjacent the ring 112 in the manner best illustrated in FIG. 3. The shroud 148 defines a discharge port 152 which is adapted to cooperate with an axially extending fluid passage 154 extending coaxially through the interior of the shaft 18 in communicating lubricating oil to the clutch-brake unit 10 of the present invention in a manner later to be described.

Briefly, in operation, the flywheel 20 is adapted to be rotated through suitable rotation of a plurality of V-belts (not shown) peripherally engaged therewith. Rotation of the flywheel 20 is adapted to be selectively transmitted via the clutch-brake unit 10 of the present invention to the drive shaft 18 which in turn transmits rotative power to the pinion gear 122. As will hereinafter be described in detail, the clutch-brake unit 10 normally has the brake elements thereof engaged so as to pre-clude rotation of the drive shaft 18 even though the flywheel 20 may be rotating; however, upon actuation of the unit 10, the braking elements will be released and the clutching elements will be engaged so that the flywheel 20 will be drivingly connected to the drive shaft 18 so that rotational power or torque will be transmitted from the flywheel 20 to the pinion gear 122.

Mounted on the drive shaft 18 interiorly of the enclosure member 40 is an annular or ring-shaped hub or support member 156 which defines a central bore 158 adapted to be contiguously engaged with the periphery of the adjacent section of the shaft 18. The member 156 is secured between an annular radially outwardly extending shoulder 160 on the shaft 18 and a split retaining ring 162 which is mounted within an annular recess 164 formed around the periphery of the shaft 18. The outer periphery of the member 156 is formed with the plurality of radially outwardly extending, circumferentially spaced splined formations 166 which are adapted to operatively receive and support a plurality of adjacently oriented friction discs, generally designated 168. The friction discs 168 are provided with internal openings complementary to the formations 166 and adapted for splined engagement therewith, whereby the discs 168 will be mounted in axially spaced, radially outwardly extending parallel relation, as best seen in FIG. 3.

A series of friction brake plate members, generally designated 170, are each provided with a plurality of circumferentially spaced, radially inwardly extending notches adapted for keyed engagement with a plurality of longitudinally extending, circumferentially spaced drive lugs 172 that are mounted upon a generally conically shaped or tapered lug support member 174 disposed coaxially of the shaft 18. The support member 174 is formed with an enlarged thickness annular mounting section 176 that defines a central opening 177 which is adapted to be secured by means of a suitable keyway 178 and annular retaining ring 180 to an axially extending sleeve-like support section 182 of the support member 70. In a preferred construction of the present invention, the support member 174 is provided with four circumferentially spaced lugs 172, and the brake plate members 170 are formed with a corresponding number of notched recesses adapted for engagement with the lugs 172, although it will be apparent that more or less drive lugs 172 may be used when desired or found necessary. Mounted on the end of the member 156 adjacent the support member 174 is an annular, radially extending abutment ring 184 which defines a radially extending face 186 that confronts the friction discs 168 and is fixedly secured to the support member 156 by means of a plurality of suitable axially extending screws, bolts or the like 188.

Disposed axially from the member 156 is a second hub or support member 190 which is of a generally annular configuration and defines a central bore 192 which is contiguously engaged with the periphery of the shaft 18. The support member 190 is retained upon the shaft 18 by being axially positioned between an annular shoulder 194 and the inner race of the bearing assembly 102, the support member 190, like the member 156, preferably being keyed or otherwise secured against rotation relative to the drive shaft 18, as will be apparent. The outer periphery of the support member 190 is formed with a plurality of radially outwardly projecting, axially extending splined-like formations 196 which are similar to the formations 166 and are adapted for splined engagement with a plurality of axially spaced parallel radially disposed clutch friction discs 198 which are preferably identical in construction to the discs 168 and are cooperable with a plurality of axially spaced radially extending clutch plate members 200 which are disposed in alternating relation with the clutch discs 198. The clutch plate members 200 are externally notched and are thereby adapted for keyed engagement with a plurality (of preferably four) of axially extending, circumferentially spaced drive lugs 202 which are fixedly secured to end wall member 16 and project inwardly therefrom, as seen in FIG. 3. Mounted at the axially outer end of the support member 190 is an annular, radially extending abutment ring 204 which may be secured by any suitable means against rotation to the support member 190 and defines a radially extending abutment face 206 which is co-operable with the clutch friction discs 198 in a manner herein-after to be described.

The support member 190 is formed with a plurality of axially extending, circumferentially spaced bores, generally designated 208, at the axially inner end thereof, which bores 208 are adapted to each receive and operatively support a helical coil spring 210. The springs 210 have the outer ends thereof abutting against end walls 212 defined within the bores 208, while the opposite ends of the springs 210 extend axially from the adjacent end of the support member 190 are adapted to function in a manner hereinafter to be described in effecting frictional engagement between the brake plate members 170, and brake discs 168.

Disposed axially between the plurality of clutch plate members 200 and friction plate members 170 is an annular piston assembly, generally designated 214. The assembly 214 comprises a generally radially extending end member 216 which is formed with an axially extending abutment section 218 that projects toward the friction discs 168 and defines a radially extending abutment surface 220 engageable with the adjacent of said discs 168. The radially outermost part of the end member 216 is formed with a reduced thickness flange section 222 which is secured by a plurality of circumferentially spaced screws, bolts or the like 224 to an annular, axially extending section 226 of a generally cupped-shaped piston member 228. The member 228 is formed with a radially inwardly extending section 230 that is integrally connected to the section 226 and is secured by suitable screws, bolts or the like 232 to a generally ring-shaped actuating member 234 that extends around the shaft 18 at a position adjacent the clutch friction discs 198. The member 234 defines a radially extending abutment face 236 that is abuttingly engageable with the adjacent of the friction discs 198 and is thereby cooperable with the face 206 of the abutment ring 204 in frictionally engaging the plate members 200 with the discs 198, as will be described. A suitable O-ring sealing member or the like 238 is provided interjacent the axially extending confronting surfaces of the members 228 and 234, with the member 234 comprising a radially inwardly extending section 240 disposed in peripheral engagement with the shaft 18 and defining a radial face 242 against which the springs 210 abut.

As will later be described in detail, the entire piston assembly 214 is adapted to move axially of the shaft 18 in response to the introduction of pressurized air into the interior thereof. Toward this end, suitable O-ring sealing means 244 is provided around the radially innermost portion of the member 234 which is sealingly engageable with an annular surface 246 formed around the shaft 18. Similarly, O-ring sealing means 248 is provided around the inner periphery of the member 216 and adapted to sealingly engage an annular surface 250 formed around an annular support section 252 of a generally radially disposed partition member 260, the section 252 being provided with suitable O-ring sealing means 254 adapted to sealingly engage another annular surface 256 defined by the shaft 18.

The members 216, 228 and 234 define an internal cavity 258, the interior of which is divided into two axially spaced compartments 262 and 264 by the partition member 260. The outer periphery of the partition member 260 is provided with an O-ring sealing means 266 adapted to sealingly engage the inner periphery of the axially extending section 226 of the member 228, with a suitable O-ring sealing means 268 being provided interjacent the radially inner side of the member 260 and an annular recess 270 formed around the periphery of the shaft 18 interjacent the annular surfaces 246 and 256. It will be seen that the member 260 is fixedly secured relative to the shaft 18 by being axially compressed between an annular shoulder 271 formed around the shaft 18 adjacent the recess 270, and the axially adjacent end of the support member 156 which is in turn secured in place by the split ring 162.

Briefly in operation of the present invention, the plurality of springs 210 urge the assembly 214 toward the left in FIG. 3, whereby the face 220 cooperates with the face 186 in compressingly engaging the friction discs 168 and brake plates 170. Pressurized air is intended to be admitted into the compartment 262, whereby the entire assembly 214 is biased or urged toward the right in FIG. 3 against the resistance of the springs 210, until such time as the face 236 compressingly engages the adjacent of the clutch discs 198 and thereby cooperates with the face 206 in frictionally engaging the plurality of clutch plates 200 with the friction discs 198.

In order to admit air into the interior of the compartment 262, the shaft 18 is formed with a central axially extending air passage 272 which is communicable through a conventional rotary union 274 located at the left end of the shaft 18 as viewed in FIG. 3 with a suitable source of pressurized air. The opposite (right) end of the passage 272 is communicable through a radially outwardly extending passage 276, the radially outermost portion of which is communicable with the interior of the compartment 262, as illustrated. The interior of the compartment 264 is adapted to be communicable with a suitable air vent through another axially extending air passage 278 which is formed in the drive shaft 18 and is communicable through an air passage 280 formed in the member 260 and a radially extending passage 282 formed in the shaft 18. The purpose of venting the compartment 264 will be described in connection with the overall operation of the present invention.

The interior of the cavity 32 is designed to be filled or at least substantially filled with a volume of lubricating oil which functions to minimize the frictional wear between the plates 170, 200 and friction discs 168 and 198, respectively, and to provide a heat transfer function in maintaining the operating temperature of the unit 10 at a relatively low level. Toward this end, the unit 10 is provided with an auxillary oil reservoir 284 provided with a suitable oil pump or the like 286 that is adapted to function in communicating oil from the reservoir 284 through a suitable fluid conduit 288. The conduit 288 is communicable through a suitable union 290 with the aforedescribed axially extending fluid passage 154 formed in the shaft 18, and the passage 154 is in turn communicable through a radially extending passage 291 with the interior or the bearing assembly 134 and through suitable additional radially extending oil passage means 292 with the interior of the cavity 32. Lubricating oil is adapted to be transmitted or communicated out of the cavity 32 via suitable internal oil passage 293, one of which is formed in the member 70 and communicable with an oil return conduit 294 connected to the reservoir 284. It will be noted that the annular enclosure or shroud member 148 provides a labyrinth sealing arrangement, well known in the art, adjacent the bearing assembly 134, with the annular space provided interjacent the shaft 18 and the shroud 148 being communicable through the discharge port 152 and suitable oil conduit means (not shown) with the interior of the reservoir 284 so that any residual oil within said annular chamber will be communicated back to the reservoir.

Figure 4:
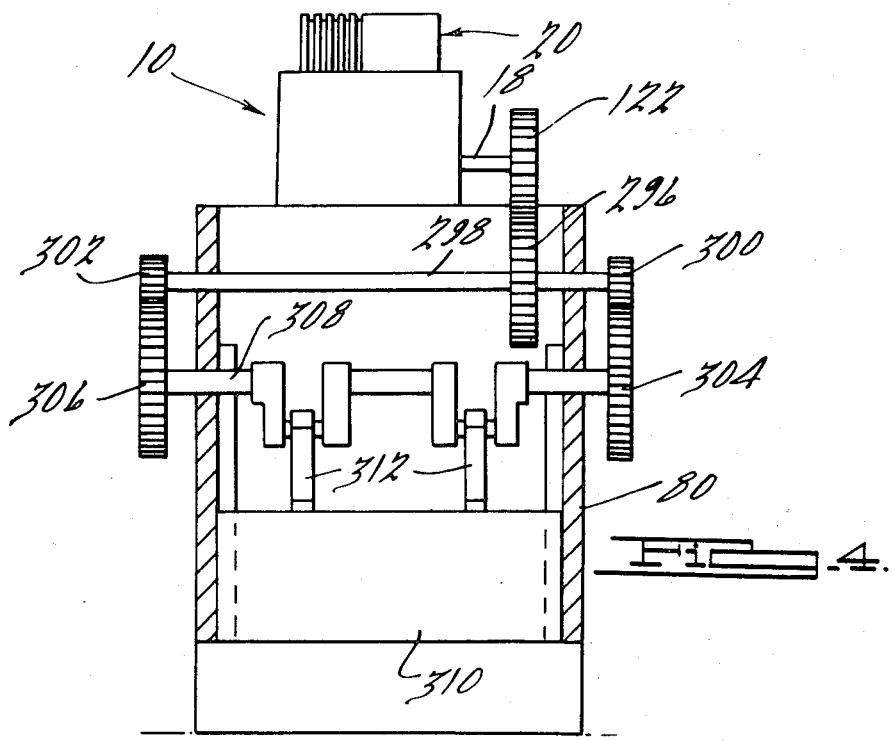
FIG. 4 is a side elevational view of a typical machine with which the first preferred clutch-brake unit of the present invention may be operatively associated.

By way of example, the unit 10 of the present invention is shown in FIG. 4 in a typical operational environment, wherein the pinion gear 122 is meshingly engaged with an associated intermediate gear 296 rotatably mounted on a shaft 298. The shaft 298 is suitably supported within the support structure 80 and is provided with drive gears 300 and 302 on the ends thereof, which gears 300, 302 are drivingly engageable with associated gears 304, 306, respectively, mounted on the ends of a suitable crankshaft 308 that is connected to an associated end slide mechanism 310 via conventional connecting rods 312. It will be seen that the torque transmitting elements of the clutch are characterized by an alternate arrangement of the plurality of clutch plate members 200 and friction discs 198, with one of the discs 198 being disposed adjacent the face 206 and another of said discs being disposed adjacent the face 236. The torque transmitting portion of the brake is characterized in a similar manner by an alternate arrangement of the plurality of brake plate members 170 and friction discs 168, with one of the discs 168 being disposed adjacent the face 220 and another thereof being disposed adjacent the face 186.

Assuming the initial condition that lubricating oil is circulating to and from the reservoir 284 via the oil passages 154, 291, 292 and 293, and further assuming that the passages 272 and 276 are communicable with a suitable source of pressurized air, at such time as it is desired to engage the clutch, the aforesaid pressurized air is communicated through the passages 272 and 276 into the interior of the compartment 262, thereby forcing the piston assembly 214 toward the right in FIG. 3 against the resistance of the plurality of springs 210. Such movement of the assembly 214 will effect simultaneous longitudinal movement of the faces 236 and 220, thereby accomplishing two functions. First of all, the face 236 will cooperate with the face 206 in frictionally engaging the plurality of discs 198 with the members 200, whereby to drivingly connect the flywheel 20 to the drive shaft 18. Secondly and simultaneously, the aforesaid longitudinal movement of the assembly 214 causes the face 220 to move longitudinally away from the adjacent disc 168, thereby releasing the brake in order to permit rotation of the shaft 18. Accordingly, rotation of the flywheel 20, via any suitable V-drive belts or the like (not shown) will be transmitted through the drive shaft 18 to the pinion gear 122, and thereafter through the environmental gear structure shown in FIG. 4 to operate the end slide mechanism 310 or the like. At such time as the pressure within the compartment 262 is relieved, the plurality of springs 210 become operable to longitudinally bias the entire piston assembly 214 toward the left in FIG. 3, with the result that the face 236 will move away from engagement with the adjacent disc 198 in order to release the clutch, and simultaneously, the face 220 will cooperate with the face 186 in frictionally engaging the plurality of discs 168 and members 170, thereby engaging the brake to preclude any rotary motion of the flywheel 20 from being transmitted to the drive shaft 18 and hence to the pinion gear 122 mounted thereon. If desired, the vent passages 280, 282 and 278 may be made communicable with a suitable source of pressurized air which will function, via suitable air valving, in aiding or supplementing the springs 210 in biasing the piston assembly 214 toward the position engaging the brake and releasing the clutch.

It will be noted that the sides of the partition member 260 confronting the compartments 262 and 264 are of substantially equal effective areas. With this construction, upon reciprocal movement of the piston assembly 214 relative to the partition member 240, a relatively small amount of air will be displaced through the vent air passages 280, 282 and 278 due to the balanced conditions of the surface areas on the opposite sides of the member 260. Accordingly, the present invention obviates the need for any expensive high pressure seals or the like which would be necessary in the case where a large amount of air was expended from the unit 10 during operation thereof.

One particularly important feature of the present invention resides in the fact that effective cooling or heat dissipation is achieved without the need for any ancillary forced air fans or the like. The reason for this resides in the fact that during rotation of the flywheel 20, the members 16, 40 and 14, which constitute the side walls of the cavity 32, are rotating through the ambient air conditions, with the fins or ribs 64, 66 creating a substantial amount of air circulation or turbulence during rotation thereof. The lubricating oil which is contained within the cavity 32 is circulated radially outwardly therewithin under the influence of the centrifugal force created upon rotation of the flywheel 20, with the result that such oil continuously circulates adjacent the outer wall of the cavity 32 where the heat of the oil is effectively dissipated. It will be noted that if an auxiliary heat dissipating means is deemed necessary, the oil reservoir 284 may be provided with any suitable type of heat exchanger well known in the art, and that conversely, in the event of relatively small amount of heat dissipation is required, for example, wherein the unit 10 is of a relatively small size and capacity, the interior of the cavity 32 may be merely made communicable with a suitable reservoir of oil, thereby obviating the need for oil circulating system as shown herein.

Additional features of the present invention reside in the fact that the entire clutch-brake unit 10 may be preassembled on the drive shaft 18 preparatory to the flywheel 20 being operatively positioned and mounted. Thus, the unit 10 may be thoroughly adjusted, tested and generally placed in a workable position without the presence of the flywheel 20, thereby considerably facilitating installation of the present invention. It will be also noted that the flywheel 20 may be attached or operatively connected to the unit 10 in a variety of different ways, as will be apparent to the skilled artisian, and the present invention is not intended to be limited to any specific manner in which the flywheel is operatively mounted, other than the flywheel being disposed in heat conducting relation with respect to the interior of the cavity 32 so that rotation of the flywheel will function in effectively dissipating the high temperature conditions attendant within the cavity 32 during operation of the unit 10.

The first embodiment of the unit 10 of the present invention will be seen to have a wide variety of different applications, from extruding devices, bolt making machines, and virtually all types of flywheel type metal forming or stamping presses, with the present invention finding particularly useful application in replacing conventional so-called dry clutch presses heretofore known in the art so that such presses may be readily converted or up-dated through the installation of the clutch-brake unit 10 of the present invention.

With reference now to FIG. 5 of the drawings, a second embodiment of the clutch-brake unit is indicated generally at 10', being generally similar in design and operation to the unit 10 of the first embodiment, but adapted for applications requiring less torque capacity and particularly adapted for use with small stamping presses and the like. For purposes of clarity, all component parts of the second embodiment which are either common, or substantially similar, to the first embodiment are designated by like numerals having a prime (') suffix.

The clutch-brake unit 10', in accordance with the present invention, is shown generally as comprising a rotatable housing 300 having end walls 302 and 304 which are spaced axially or longitudinally along a rotatable drive shaft, generally designated by the numeral 306. The housing 300 forms an inner hub assembly for operatively connecting a driving member, such as a rotatable flywheel, sheave, sprocket, gear, or the like, and generally designated 308, to the shaft 306, with the driving member 308 comprising an outer peripheral portion 310 and an inwardly extending annular flange portion 312. The flange portion 312 is fixedly connected to an outwardly extending flange 314 disposed on an outer surface of the housing 300 by means of a plurality of circumferentially spaced, axially extending screws, bolts, or the like 316.

The housing 300 further includes a central axially extending bore 318 spaced radially outwardly from the periphery of the shaft 306 and defining one marginal wall portion of an internal cavity 320 within which are located the clutch and brake elements of the present invention. One axial end of the cavity 320 is closed by an end enclosure member 322 which is fixedly secured by suitable screws, bolts or the like 323 to the housing 300, with suitable gasket means, or the like, 324 being provided between an annular, radially extending shoulder 326 formed on the enclosure member 322 and the axial outer end of the housing 300.

The member 322 defines a central opening 68' which is arranged coaxially of the drive shaft 306 and the periphery of which is spaced radially outwardly from the outer surface thereof. Disposed between the inner periphery of the opening 68' and the outer periphery of the drive shaft 306 is an annular, axially extending portion of a quill member, generally designated by the numeral 342. The inner end of the quill member extends axially inwardly from the end wall member 322 and defines an annular axially extending shoulder 72' upon which the inner race of an anti-friction bearing assembly 74' is mounted. The outer race of the assembly 74' abuts against an annular shoulder 76' defined around the inner periphery of the enclosure member 322, with the result that the members 322 and 300, and including the driving member 308, are rotatably supported relative to the quill member 342, the member 342 having mounting feet (not shown) which are adapted to be bolted to a suitable support attached to the machine frame. The support may be of any suitable construction which is of a relatively rugged, heavy-duty design as is necessary and conventional in rotatably supporting the unit 10'. Together with supporting the bearing assembly 74', the quill member 342 also supports another anti-friction bearing assembly, generally designated 82', the inner race of which is engaged with an annular shoulder 84' formed around the adjacent end of the drive shaft 306, and the outer race of which is received within an annular recess 81' formed around the inner periphery of the quill member 342. The bearing assembly 82', together with suitable fluid sealing means, such as an annular lip seal or the like 86', is positively retained in place in the end of the quill member 342 by means of a suitable snap ring 88' which is removably secured in a suitable groove 344 in the member 342. The inner race of the bearing assembly 82' is also preferably secured upon the inner end of the drive shaft 306 by being axially retained between a radially outwardly extending abutment wall 94' defined by the shaft 306 and a suitable snap retaining ring 96' that engages a suitable annular groove 95' disposed in the shaft 306.

The end of the cavity 320, opposite that which is closed by the enclosure member 322 is adapted to be closed by an inwardly extending flange portion 328 of the housing 300, and a radial shoulder 330 formed on a clutch spider member 332. The clutch spider member 332 is formed with a radially outwardly extending flange section 334, which section 334 is fixedly secured by means of a plurality of circumferentially spaced, axially extending suitable screws, bolts or the like, 336, to the radially inwardly projecting flange 328 of the housing 300, suitable fluid-tight gasket means 338 being provided between the confronting sides of the flange 334 and flange portion 328. Additionally, the housing member 300 is preferably provided with circumferentially spaced, axially extending ribs or fins, generally designated 340 for purposes of heat dissipation, as will later be described in detail.

The clutch spider member 332 defines a central opening 100' that is coaxially aligned with the opening 68' and through which one end of the drive shaft 306 extends. The shaft 306 is rotatably supported relative to the opening 100' by means of an anti-friction bearing assembly 102', the inner race of which is seated on an annular shoulder 344 defined on an outer surface of the shaft 306. The outer race of the bearing assembly 102' is adapted to be axially retained between an annular shoulder 110' formed around the periphery of the opening 100' and an annular snap ring 112' that is secured in a groove 347' defined and suitably spaced in the opening 100'. Also, suitable lip sealing means or the like 120' is provided between the inner periphery of the clutch spider member 332 and the outer periphery of the shaft 306.

The drive shaft 306 extends axially outwardly from the spider clutch 332 and is provided, at the axially outer end thereof, with a suitable companion flange, generally designated 122', which may be secured by means of suitable nuts and bolts 345 to a complementing flange 346 operatively connected to the equipment or machinery to be driven.

Briefly, in operation, the driving member 308 is adapted to be rotated by any suitable means complementary therewith. Rotation of the driving member 308 is adapted to be selectively transmitted via the clutch-brake unit 10' of the second embodiment of the present invention, to the drive shaft 306, which in turn transmits rotative power to the equipment or machinery to be driven. As will hereinafter be described in detail, the clutch-brake unit 10' normally has the brake elements thereof engaged so as to preclude rotation of the drive shaft 306, even though the driving member 308 may be rotating; however, upon actuation of the unit 10', the braking elements will be released and the clutching elements will be engaged so that the driving member 308 will be drivingly connected to the drive shaft 306 so that rotational power or torque will be transmitted from the driving member 308 to the complementing flange 346 and drive shaft of the equipment to be driven.

Mounted on the drive shaft 306 interiorly of the enclosure member 322 is an annular or ring-shaped hub or support member 156' which defines a central bore 158' adapted to be contiguously engaged with the periphery of the adjacent section of the shaft 306. The member 156' is secured between an annular radially outwardly extending shoulder 160' on the shaft 306 and a suitable snap retaining ring 162' which is seated within an annular groove or recess 164' formed around the outer periphery of the shaft 306. The outer periphery of the member 156' is formed with the plurality of radially outwardly extending, circumferentially spaced splined formations 166' which are adapted to operatively receive and support a plurality of adjacently oriented friction discs, generally designated 168'. The friction discs 168' are provided with internal openings complementary to the formations 166' and adapted for splined engagement therewith, whereby the discs 168' will be mounted in axially spaced, radially outwardly extending parallel relation.

A series of friction brake plate members, generally designated 170', are each provided with a plurality of circumferentially spaced, radially inwardly extending notches adapted for keyed engagement with a plurality of longitudinally extending, circumferentially spaced drive lugs 172' that are mounted upon a generally conically shaped or tapered brake-spider member 174' disposed coaxially of the shaft 306. The brake-spider member 174' is formed with an enlarged annular mounting section 176' that defines a central opening 177' which is adapted to be secured by means of a suitable keyway 178' and an annular snap ring 180' to an axially extending sleeve-like support section 182' of the quill member 342. In a preferred construction of the present invention, the brake-spider member 174' is provided with four circumferentially spaced lugs 172', and the brake plate members 170' are formed with a corresponding number of notched recesses adapted for engagement with the lugs 172', although it will be apparent that more or less drive lugs 172' may be used when desired or found necessary. Mounted on the end of the member 156' adjacent the brake-spider member 174' is an annular, radially extending abutment ring 184', which defines a radially extending face 186' that confronts the friction discs 168', and is fixedly secured to the support member 156' by means of a plurality of suitable axially extending screws, bolts or the like 188'.

Disposed axially to the right of the member 156', as illustrated in FIG. 5, is a disc support portion 190' of the shaft 306 having an outer periphery formed with a plurality of radially outwardly projecting, axially extending splined-like formations 196', which are similar to the formations 166' of support member 156', and are adapted for splined engagement with a plurality of axially spaced, parallel, radially disposed, clutch friction discs 198'. The discs 198', which are preferably identical in construction to the discs 168', are cooperable with a plurality of axially spaced radially extending clutch plate members 200' which are disposed in alternating relation with the clutch discs 198'. The clutch plate members 200' are externally notched and adapted for keyed engagement with a plurality (of preferably four) of axially extending, circumferentially spaced drive lugs 202' which are integral to the clutch-spider member 332 and project inwardly therefrom. Mounted at the axially outer end of the disc support portion 190' is an annular, radially extending abutment ring 204' which may be secured by any suitable means against rotation to the support portion 190', and defines a radially extending abutment face 206' which is cooperable with the clutch friction discs 198' in a manner hereinafter to be described.

Disposed axially between the plurality of clutch plate members 200' and friction plate members 170' is an annular piston assembly, generally designated 214'. The assembly 214' comprises a generally radially extending end member 216' which is formed with an axially extending abutment section 218' that projects toward the friction discs 168' and defines a radially extending abutment surface 220' engageable with the adjacent of said discs 168'. The radially outermost part of the end member 216' is formed with a reduced thickness flange section 222' which is secured by a plurality of circumferentially spaced screws, bolts or the like 224' to an annular, axially extending section 226' of a generally cup-shaped piston member 228'. The member 228' is formed with a radially extending portion 230' that is integrally connected to the section 226', and also integrally to a generally ring-shaped actuating portion 234' that extends around the shaft 306 at a position adjacent the clutch friction discs 198. The portion 234' defines a radially extending abutment face 236' that is abuttingly engageable with the adjacent of the friction discs 198' and is thereby cooperable with the face 206' of the abutment ring 204' in frictionally engaging the plate members 200' with the discs 198', as will subsequently be described.

As will later be described in detail, the entire piston assembly 214' is adapted to move axially of the shaft 306 in response to the introduction of pressurized air into the interior thereof. Toward this end, a suitable O-ring sealing means 244' is provided around the radially innermost portion of the piston 228' which is sealingly engageable with an annular surface 246' formed around the shaft 306. Similarly, an O-ring sealing means 248' is provided around the inner periphery of the member 216' and adapted to sealingly engage an annular surface 250' formed around an annular support section 252' of a generally radially disposed partition member 260', the section 252' being provided with suitable O-ring sealing means 254' adapted to sealingly engage another annular surface 256' defined by the shaft 306.

The members 216' and 228' define an internal cavity 258', the interior of which is divided into two axially spaced compartments 262' and 264' by the partition member 260'. The outer periphery of the partition member 260' is provided with an O-ring sealing means 266' adapted to sealingly engage the inner periphery of the axially extending section 226' of the member 228', with a suitable O-ring sealing means 268' being provided interjacent the radially inner side of the member 260' and an annular recess 270' formed around the periphery of the shaft 306. It will be seen that the member 260' is fixedly secured relative to the shaft 306 by being axially compressed between an annular shoulder 271' formed around the shaft 306 adjacent the recess 270', and the axially adjacent end of the support member 156' which is in turn secured in place by the snap ring 162'.

The end member 216' and the partition member 260' are formed with a plurality of axially aligning, circumferentially spaced blind bores, generally designated 208' and 209' respectively, receiving and operatively supporting a plurality of helical coil springs 210. The outer ends of the springs 210' abut against a pair of annular shaped end walls 212' and 213' as defined by the bores 208' and 209' respectively. The springs 210' and the partition member 260' are adapted to function in a manner hereinafter to be described in effecting frictional engagement between the brake plate members 170', and the brake discs 168'. To provide an equal surface on both sides of the partition member 260', a radial extending ridge or rim 350 projects outwardly therefrom, on the radial side surface opposite the bore 209' and is adapted to engage a complementing ring-shaped groove 352 disposed in an adjacent complementary face of the piston member 228'.

Briefly in operation of the present invention, the plurality of springs 210' urge the assembly 214' toward the left, as illustrated in FIG. 5, whereby the face 220' cooperates with the face 186' in compressingly engaging the friction discs 168' and brake plates 170'. Pressurized air is intended to be admitted into the compartment 262', whereby the entire assembly 214' is biased or urged toward the right against the resistance of the springs 210', until such time as the face 236' compressingly engages the adjacent of the clutch discs 198', and thereby cooperates with the face 206' in frictionally engaging the plurality of clutch plates 200' with the friction discs 198'.

In order to admit air into the interior of the compartment 262', the shaft 306 is formed with a central axially extending air passage 272' which is communicable through a conventional rotary union 274' located at the left end of the shaft 306, as viewed in FIG. 5, with a suitable source of pressurized air. The opposite (right) end of the passage 272' is communicable through a radially outwardly extending passage 276', the radially outermost portion of which is communicable with the interior of the compartment 262', as illustrated. The interior of the compartment 264' is adapted to be communicable with a suitable air vent through another axially extending air passage 278' which is formed in the drive shaft 306 and is communicable through an air passage 280' formed in the member 260' and a radially extending passage 282' formed in the shaft 306. The purpose of venting the compartment 264' will be described in connection with the overall operation of the present invention.

The interior of the cavity 320 is designed to be filled or at least substantially filled with a volume of lubricating oil which functions to minimize the frictional wear between the plates 170', 200' and friction discs 168' and 198', respectively, and to provide a heat transfer function in maintaining the operating temperature of the unit 10' at a relatively low level. Toward this end, the unit 10' preferably includes a suitable radially extending bore 354 located in the quill member 342, wherein the lubricating oil may be introduced into the cavity 320 of the unit 10'. The lubricating oil system preferably includes an expansion tank (not shown) which includes a breather to keep the internal cavity 320 completely filled with oil.

Assuming an initial condition wherein the lubricating oil completely fills the cavity 320 under the influence of a fluid connection from the expansion tank, and further assuming that the passages 272' and 276' are communicable with a suitable source of pressurized air, at such time as it is desired to engage the clutch, the aforesaid pressurized air is communicated through the passages 272' and 276' into the interior of the compartment 262', thereby forcing the piston assembly 214' toward the right as illustrated in FIG. 5, against the resistance of the plurality of springs 210'. Such movement of the assembly 214' will effect simultaneous longitudinal movement of the faces 236' and 220' whereby the face 236' will cooperate with the face 206' to frictionally engage the plurality of discs 198' with the members 200' and drivingly connect the driving member 308 to the drive shaft 306, and simultaneously the face 220' will move longitudinally away from the adjacent disc 168', thereby releasing the brake in order to permit rotation of the shaft 306. Accordingly, rotation of the driving member 308 via any suitable means (not shown) will be transmitted through the drive shaft 306 to the complementing flange 346, and thereafter to the equipment coupled therewith.

At such time as the pressure within the compartment 262' is relieved, the plurality of springs 210' become operable to longitudinally bias the entire piston assembly 214' toward the left, with the result that the face 236' will move away from engagement with the adjacent disc 198' in order to release the clutch, and simultaneously, the face 220' will cooperate with the face 186' in frictionally engaging the plurality of discs 168' and members 170', thereby engaging the brake to preclude any rotary motion of the driving member 308 from being transmitted to the drive shaft 306 and hence to the complementary flange 346 coupled therewith. If desired, the vent passages 280', 282' and 278' may be made communicable with a suitable source of pressurized air which will function, via suitable air valving, in aiding or supplementing the springs 210' in biasing the piston assembly 214' toward the position engaging the brake and releasing the clutch.

It will be noted that the sides of the partition member 260' confronting the compartments 262' and 264' are of substantially equal effective areas. With this construction, upon reciprocal movement of the piston assembly 214', relative to the partition member 260', a relatively small amount of air will be displaced through the vent air passages 280', 282' and 278' due to the balanced conditions of the surface areas on the opposite sides of the member 260'. Accordingly, the present invention obviates the need for any expensive high pressure seals or the like which would be necessary in the case where a large amount of air was expended from the unit 10' during operation thereof.

As previously indicated with reference to the first described embodiment of the present invention, the second embodiment also includes the important feature of providing effective cooling or heat dissipation without the need for any ancillary forced air fans or the like. Toward this end, the housing 300 includes a plurality of ribs 340, and additionally the end wall 322 is further provided with a plurality of radial extending fins or ribs 360, both of which are adapted to create a substantial amount of air circulation or turbulence during rotation thereof. The lubricating oil which is contained with the cavity 320 is circulated radially outwardly therewithin under the influence of the centrifugal force created upon rotation of the driving member 308, with the result that such oil continuously circulates adjacent the outer wall of the cavity 320. The heat of the oil is then effectively dissipated by heat transfer to the housing 300 and to the driving member 308 which is drivingly connected therewith.

While it will be apparent that the preferred embodiments illustrated herein are well calculated to fulfill the objects above stated, it will be appreciated that the present invention is susceptible to modification, variation and change without departing from the scope of the invention.

I claim:

1. A viscous shear clutch brake unit adapted to be mounted in the bore of a flywheel proximate a relatively non-rotatable support structure, the unit comprising: a quill member adapted to be supported by said support structure; a drive shaft having a first end rotatably supported by said quill member; a first and second series of friction discs carried by said drive shaft; a plurality of brake plates carried by said quill member and interleaved with one of said series of friction discs; a plurality of clutch plates supported for rotation with said flywheel and interleaved with said other series of friction discs; actuating means for selectively engaging said clutch plates with said other series of friction discs while simultaneously releasing said brake plates with said one series of friction discs and vice-versa; and a housing assembly adapted for rotation with said flywheel, and forming a fluid reservoir at least partially surrounding said discs and plates and adapted to be at least partially filled with a cooling liquid media, said assembly including a generally cylindrically shaped housing member having a radially projecting flange section adapted to be connected to the bore of said flywheel in heat transfer relationship therewith, said member also including air circulating means located on an outer peripheral surface thereof for transferring heat away from said unit whereby heat generated by engagement of said discs and plates is effectively dissipated to said flywheel via said housing member and also via said air circulating means.

2. The clutch brake unit as recited in claim 1 wherein said assembly also includes a radially extending end wall rotatably supported by said quill member and connected to one end of said housing member, said end wall including second air circulating means for dissipating heat generated by said unit.

3. The clutch brake unit as recited in claim 1 wherein said air circulating means includes a plurality of circumferentially spaced fins located about the outer periphery of said housing member.

4. The clutch brake unit as recited in claim 2 wherein said second air circulating means includes a plurality of radially extending fins located on an outer surface of said end wall.

5. A viscous shear clutch brake unit adapted to be mounted in the bore of a flywheel proximate a relatively non-rotatable support structure, the unit comprising: a quill member adapted to be supported by said support structure; a drive shaft having a first end rotatably supported by said quill member; a housing assembly defining a fluid reservoir and connected to the bore of the flywheel for rotation therewith, said reservoir adapted to be at least partially filled with a liquid cooling media; a series of radially extending clutch plates disposed interiorly of said housing assembly and mounted for rotation therewith; a series of non-rotatable radially extending brake plates disposed interiorly of said housing member and supported by said quill member; a series of friction discs mounted on said drive shaft for rotation therewith and adapted for selective frictional engagement with said clutch and brake plates; actuating means including a piston assembly mounted coaxially of said drive shaft and movable axially thereof, with movement in one direction serving to simultaneously frictionally engage said clutch plates with certain of said friction discs and to release the remaining friction discs from frictional engagement with said brake plates, and with movement thereof in another direction serving to simultaneously release said clutch plates from frictional engagement with said certain friction discs and to frictionally engage said remaining friction discs with said brake plates, said piston assembly including an axially stationary partition member carried by said drive shaft, and an axially movable enclosure surrounding said partition member and defining first and second compartments on opposite axial sides thereof, at least one of said compartments being selectively pressurizable whereby to cause said assembly to move axially of said drive shaft to effect respective engagement and disengagement of said clutch and brake plates with said clutch and brake discs; and bias means located in the other of said compartments for engaging the brake whereby to provide a failsafe in the absence of selectively pressing said one compartment.

6. The clutch brake unit as recited in claim 5 wherein one of said compartments and said partition member each include a plurality of circumferentially spaced bores, and wherein said bias means includes a plurality of spring elements, one element being located in each of said bores.

7. The clutch brake unit as recited in claim 6 wherein the other of said compartments includes passage means for providing a substantially equal and opposed surface area relative to said one compartment, and wherein said partition members includes protuberance means at least partially located in said passage means for providing substantially equal surface areas on opposite sides of said partition member.

8. The clutch brake unit as recited in claim 5 wherein said enclosure includes first and second abutment faces for respectively engaging said clutch and brake plates with said friction discs.

9. A viscous shear clutch brake unit adapted to be mounted in the bore of a flywheel proximate a relatively non-rotatable support structure, the unit comprising: a quill member adapted to be supported by said support structure; a drive shaft having a first end rotatably supported by said quill member; a housing assembly adapted for rotation with said flywheel, and forming a fluid reservoir at least partially surrounding said discs and plates and adapted to be at least partially filled with a cooling liquid media, said assembly including a generally cylindrically shaped housing member having a radially projecting flange section adapted to be connected to the bore of said flywheel in heat transfer relationship therewith, said member also including air circulating means located on an outer peripheral surface thereof for transferring heat away from said unit whereby heat generated by engagement of said discs and plates is effectively dissipated to said flywheel via said housing member and also via said air circulating means; a series of radially extending clutch plates disposed interiorly of said housing assembly and mounted for rotation therewith; a series of non-rotatable radially extending brake plates disposed interiorly of said housing member and supported by said quill member; a series of friction discs mounted on said drive shaft for rotation therewith and adapted for selective frictional engagement with said clutch and brake plates; actuating means including a piston assembly mounted coaxially of said drive shaft and movable axially thereof, with movement in one direction serving to simultaneously frictionally engage said clutch plates with certain of said friction discs and to release the remaining friction discs from frictional engagement with said brake plates, and with movement thereof in another direction serving to simultaneously release said clutch plates from frictional engagement with said certain friction discs and to frictionally engage said remaining friction discs with said brake plates, said piston assembly including an axially stationary partition member carried by said drive shaft, and an axially movable enclosure surrounding said partition member and defining first and second compartments on opposite axial sides thereof, at least one of said compartments being selectively pressurizable whereby to cause said assembly to move axially of said drive shaft to effect respective engagement and disengagement of said clutch and brake plates with said clutch and brake discs; and bias means located in the other of said compartments for engaging the brake whereby to provide a failsafe in the absence of selectively pressing said one compartment.

10. The clutch brake unit as recited in Claim 9 wherein one of said compartments and said partition member each include a plurality of circumferentially spaced bores, and wherein said bias means includes a plurality of spring elements, one element being located in each of said bores.

* * * * *